United States Patent

Kim et al.

Patent Number: 6,103,649
Date of Patent: Aug. 15, 2000

[54] HIGH X-RAY ABSORBING PANEL GLASS FOR CATHODE RAY TUBES

[75] Inventors: Dong-Sang Kim; Chan-Jong Lee; Seok-Soo Sheen, all of Suwon-shi, Rep. of Korea

[73] Assignee: Samsun Corning Co., Ltd., Rep. of Korea

[21] Appl. No.: 09/343,160

[22] Filed: Jun. 29, 1999

[30] Foreign Application Priority Data

Jul. 2, 1998 [KR] Rep. of Korea ................. 98-26621

[51] Int. Cl.⁷ ................... C03C 3/085; C03C 3/087; C03C 3/095

[52] U.S. Cl. ................... 501/64; 501/69; 501/70; 501/71

[58] Field of Search ................... 501/64, 69, 70, 501/71, 72

[56] References Cited

U.S. PATENT DOCUMENTS

| | | |
|---|---|---|
| 4,277,286 | 7/1981 | Boyd et al. . |
| 4,337,410 | 6/1982 | Van der Geer et al. ........... 501/64 |
| 4,376,829 | 3/1983 | Daiku ........... 501/64 |
| 4,520,115 | 5/1985 | Speit et al. ........... 501/60 |
| 4,830,990 | 5/1989 | Connelly . |
| 5,215,944 | 6/1993 | Jones ........... 501/64 |
| 5,468,692 | 11/1995 | Bock et al. . |
| 5,649,987 | 7/1997 | Greulich ........... 501/69 |

FOREIGN PATENT DOCUMENTS

| | | |
|---|---|---|
| 58-084142 | 5/1983 | Japan . |
| 58-120536 | 7/1983 | Japan . |
| 58-120537 | 7/1983 | Japan . |
| 62-288134 | 12/1987 | Japan . |
| 95-206466 | 8/1995 | Japan . |
| 2525737 | 5/1996 | Japan . |

*Primary Examiner*—Mark L. Bell
*Assistant Examiner*—David Sample
*Attorney, Agent, or Firm*—Anderson Kill & Olick

[57] ABSTRACT

A glass composition comprised of controlled amounts of BaO, SrO, ZnO and $ZrO_2$, and alkali metal oxides has a high linear X-ray absorption coefficient of at least 34 $cm^{-1}$ at a wavelength of 0.6 Å, satisfactory chromaticity and excellent resistance to devitrification, suitable for use as a panel glass of a cathode ray tube.

3 Claims, 3 Drawing Sheets

HIGH X-RAY ABSORBING PANEL GLASS FOR CATHODE RAY TUBES

FIELD OF THE INVENTION

The present invention relates to a glass composition for manufacturing a panel for use in assembling a television picture tube, which has a high X-ray absorption coefficient, suitable chromaticity and strong resistance to devitrification.

BACKGROUND OF THE INVENTION

A conventional television picture tube comprises three principal parts: an electron emitting cathode, an envelope for containing the cathode, and a panel attached to the envelope through which the picture is displayed. The electron beam emitted from the cathode activates points or dots of fluorescent materials applied on the inside surface of the panel, thereby creating an image. This bombardment on the fluorescent materials by a stream of electrons causes the generation of harmful X-ray. Since transmission of X-ray through the glass panel creates a safety problem for the television viewer, the glass panel of a television tube is required to have the capability of shielding X-ray radiation below a regulated safety level.

Accordingly, there have been made many efforts to develop glass having a high X-ray absorption coefficient, and, as a result, panel glass products having a linear X-ray absorption coefficient of, e.g., 28 to 29 cm$^{-1}$ at a wavelength of 0.6 Å have become commercially available.

However, the advent of projection cathode ray tubes has required higher operating voltages which induce higher levels of X-ray emission. Further, commercial needs for lighter-weight panels with a reduced glass thickness have necessitated a higher capability, in the panels, of absorbing X-ray radiation. Accordingly, further efforts have been made to manufacture a panel glass having an even higher X-ray absorption coefficient. For example, glass compositions for a cathode ray tube panel having a linear X-ray absorption coefficient of at least 30 cm$^{-1}$ at 0.6 Å are described in U.S. Pat. Nos. 4,277,286, 4,830,990, 5,468,692, Japanese Patent Publication No. 2,525,737 and Japanese Laid-open Patent Publication No. 206466/1995. Disclosed in these patent documents are BaO and SrO as major X-ray absorbing materials and ZnO and $ZrO_2$ as supplementary materials for shielding X-ray transmission.

However, use of increased amounts of such high X-ray absorbing materials, e.g., BaO, SrO, ZnO and $ZrO_2$, tends to bias the color of the base glass towards green and yellow. Further, as the contents of BaO and SrO increase, so does the liquidus temperature of the glass, causing the problem of devitrification. Therefore, the glass compositions disclosed in the prior art may have the devitrification problem or do not satisfy the chromaticity required of a panel glass for cathode ray tubes.

SUMMARY OF THE INVENTION

Accordingly, it is a primary object of the present invention to provide a panel glass for a cathode ray tube, having a linear X-ray absorption coefficient of at least 34 cm$^{-1}$ at a wavelength of 0.6 Å, suitable chromaticity and excellent resistance to devitrification while satisfying all other electrical and physical property requirements.

In accordance with one aspect of the present invention, there is provided a glass composition for a front panel of a cathode ray tube having a linear X-ray absorption coefficient of at least 34 cm$^{-1}$ at a wavelength of 0.6 Å, which comprises, based on the total oxides, 56.0 to 58.5 wt % of $SiO_2$, 11.0 to 13.0 wt % of BaO, 7.5 to 9.0 wt % of SrO, 2.5 to 3.5 wt % of $ZrO_2$, 1.0 to 2.5 wt % of ZnO, 0 to 0.5 wt % of $Li_2O$, 4 to 7.5 wt % of $Na_2O$, 7 to 11 wt % of $K_2O$, 1 to 2.5 wt % of $Al_2O_3$, 0 to 0.2 wt % of MgO, 0 to 0.3 wt % of CaO, 0.3 to 0.5 wt % of $TiO_2$, 0.2 to 0.5 wt % of $CeO_2$, and 0.2 to 0.5 wt % of $Sb_2O_3$; and satisfies the following formulae (1) to (3):

$$0.58 \leq C_{BaO}/(C_{BaO}+C_{SrO}) \leq 0.62 \tag{1}$$

$$4.5 \leq C_{ZrO2}+C_{ZnO} \leq 6.0 \tag{2}$$

$$0.52 \leq [C_{K2O}/(C_{K2O}+C_{Na2O})]-0.43 C_{Li2O} \leq 0.58 \tag{3}$$

wherein $C_{BaO}$, $C_{SrO}$, $C_{ZrO2}$, $C_{ZnO}$, $C_{K2O}$, $C_{Na2O}$ and $C_{Li2O}$ represent the contents in % by weight of BaO, SrO, $ZrO_2$, ZnO, $K_2O$, $Na_2O$ and $Li_2O$, respectively.

BRIEF DESCRIPTION OF THE DRAWINGS

The above and other objects and features of the present invention will become apparent from the following description thereof, when taken in conjunction with the accompanying drawings wherein.

DETAILED DESCRIPTION OF THE INVENTION

The panel glass for use in a cathode ray tube in accordance with the present invention comprises controlled amounts of BaO, SrO, ZnO and $ZrO_2$ to provide a high linear X-ray absorption coefficient and resistance to devitrification, and further comprises controlled amounts of alkali metal oxides such as $K_2O$, $Na_2O$ and $Li_2O$ to achieve other necessary properties, including a satisfactory chromaticity.

It should be noted that while BaO and SrO are used as X-ray absorbing components, excess amounts thereof may increase the liquidus temperature of a glass, which may cause devitrification of the glass during the process of feeding the molten glass to a pressing stage. To prevent the occurrence of devitrification, the liquidus temperature of a glass should be lower than a $10^5$ poise temperature, the temperature at which the viscosity of the glass becomes $10^5$ poise.

Therefore, such supplementary X-ray absorbing components as ZnO and $ZrO_2$ may be suitably employed in combination with BaO and SrO to enhance X-ray absorption while obviating the devitrification problem. However, the amounts of ZnO and $ZrO_2$ need be controlled for: an excess amount of ZnO tends to make the glass susceptible to browning from electron bombardment and a larger amount of $ZrO_2$ may make the glass difficult to melt because of its refractory nature.

In accordance with the present invention, it has been found that there exists a narrow range of $C_{BaO}/(C_{BaO}+C_{SrO})$ necessary to minimize the liquidus temperature under a same total amount of BaO and SrO, and that there are optimal ranges of the amounts of ZnO and $ZrO_2$ and their sum which satisfy the liquidus temperature requirement. The inventive glass thus comprises 11.0 to 13.0 wt % of BaO, 7.5 to 9.0 wt % of SrO, 2.5 to 3.5 wt % of $ZrO_2$ and 1.0 to 2.5 wt % of ZnO, while satisfying the conditions of formulae(1)

and (2), i.e., the values represented by formulae $C_{BaO}/(C_{BaO}+C_{SrO})$ and $C_{ZrO2}+C_{ZnO}$ lie within the ranges of 0.58 to 0.62 and 4.5 to 6.0, respectively.

Figure 1:
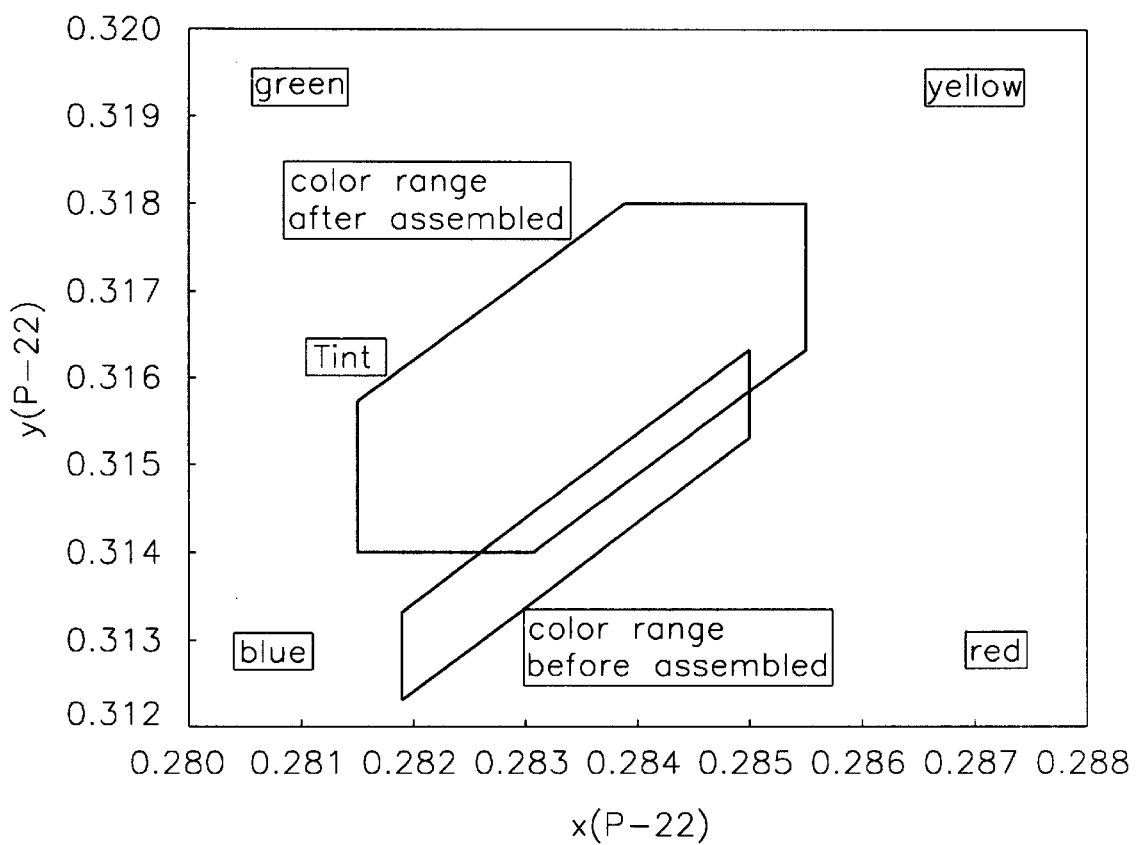
FIG. 1 shows the color range on color coordinates demanded of a standard Tint product having a light transmittance of 52.5%±2.5 before and after its assembly into a cathode ray tube.

Referring now to FIG. 1, a glass panel, a standard Tint product with a light transmittance of 52.5%±2.5, undergoes a color change towards green and yellow on assembling into a cathode ray tube. Consequently, the glass for a panel should be so prepared as to have a color biased towards blue and red in order to compensate for a color shift which may take place during assembly.

Figure 2:
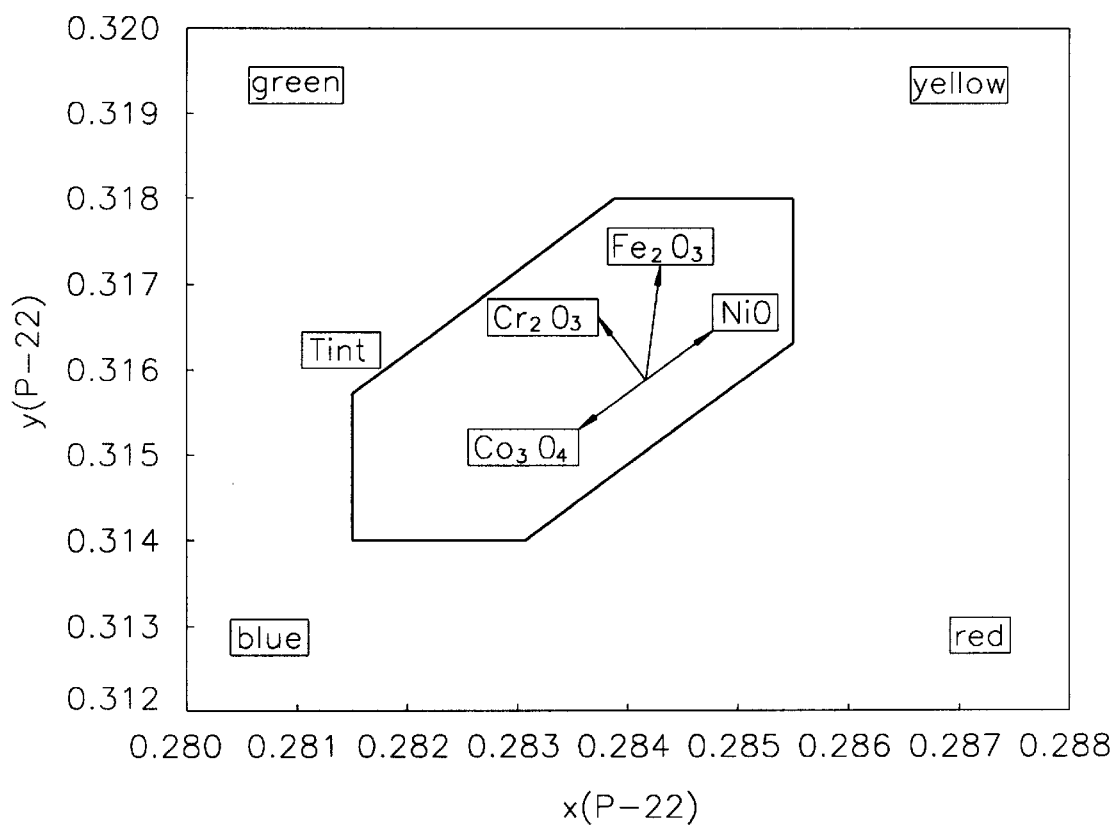
FIG. 2 illustrates the direction of color changes on color coordinates when a colorant, $Co_3O_4$, $Cr_2O_3$, $Fe_2O_3$ or NiO, is added to a glass.

However, as the contents of X-ray absorbing BaO, SrO, ZnO and $ZrO_2$ increase, the color of the base glass shifts to green and yellow. Therefore, in order to make a glass having a high X-ray absorption coefficient, it is necessary to compensate for the color shift caused by increasing the contents of such X-ray absorbing components. This compensation toward red and blue cannot be achieved by controlling the amounts of colorants such as $Co_3O_4$, $Cr_2O_3$, $Fe_2O_3$ and NiO. For, as shown in FIG. 2, $Co_3O_4$ and NiO, which are primarily used to control the light transmittance of the panel glass, have limited effects only in the direction of blue or yellow, and $Cr_2O_3$ and $Fe_2O_3$ are present as the impurities from other raw materials and thus cannot be decreased to shift the color toward red although they can change the color in the direction of green or red.

Accordingly, controlled amounts of alkali metal oxides such as $Li_2O$, $Na_2O$ and $K_2O$ are used in the inventive composition so as to compensate the color shift towards blue and red. The inventive glass composition thus comprises 0 to 0.5 wt % of $Li_2O$, 4 to 7.5 wt % of $Na_2O$ and 7 to 11 wt % of $K_2O$, and concurrently satisfies the condition of formula (3), i.e., the value represented by formula $[C_{K2O}/(C_{K2O}+C_{Na2O})]0.43C_{Li2O}$ lies within 0.52 to 0.58.

In the inventive composition, $Al_2O_3$ may be employed in an amount ranging from 1 to 2.5 wt %, which acts to lower the liquidus temperature of the glass and to enhance the chemical stability thereof.

Further, so as to inhibit the occurrences of electron browning and solarization, $CeO_2$ and $TiO_2$ may be employed in the panel glass in an amount ranging from 0.2 to 0.5 wt % and 0.3 to 0.5 wt %, respectively.

$Sb_2O_3$ may be employed in the inventive composition in an amount ranging from 0.2 to 0.5 wt % for the purpose of effectively removing bubbles during the melting process of the glass.

MgO and CaO are not added purposely but may be included in the inventive composition in amounts of less than 0.2 and 0.3 wt %, respectively, as impurities from other raw materials and glass cullets of different compositions.

The inventive glass as defined above exhibits a linear X-ray absorption coefficient of at least 34 cm$^{-1}$ at a wavelength of 0.6 Å, excellent resistance to devitrification and a satisfactory chromaticity. Also, the inventive glass possesses satisfactory electrical and physical properties required of a glass panel. Specifically, it shows a thermal expansion coefficient of 97.5 to 99.5×10$^{-7}$ °C.$^{-1}$ at 0 to 300 °C. and a strain point of at least 470° C., and an electrical resistivity, when measured at 350° C., of at least $10^7$ Ωcm. Further, it has a strong resistance against browning by X-ray or electron and solarization by ultraviolet ray.

The following Examples are intended to further illustrate the present invention without limiting its scope.

EXAMPLES 1 TO 4 AND COMPARATIVE EXAMPLES 1 to 4

Eight different glass compositions were prepared by the following procedure. Measured amounts of component materials as represented in Table 1 were charged into a V-mixer to a total amount of 600 g per batch and mixed thoroughly. The mixture was placed in a platinum crucible, and melted at 1,450° C. for 2 hours and then at 1,500° C. for 2 hours. Subsequently, the molten mixture was poured into a 100×100×12 mm graphite frame, kept in a 550° C. oven for 1 hour, and then cooled to room temperature to obtain a (Tint product) glass composition.

Various properties of the resulting glasses were determined by the following methods and the results are shown in Table 2: X-ray absorption coefficient was calculated by multiplying the density of a glass by the sum of mass absorption coefficients of constituents measured at a wavelength of 0.6 Å; thermal expansion coefficient by DIN 51045; electrical resistivity at 350° C. by ASTM C657-88; strain point by ASTM C336-71; liquidus temperature by ASTM C829-81(72 hours); and light transmittance and chromaticity with a UV-VIS spectrophotometer at 400 to 750 nm.

TABLE 1

| Component (wt %) | Examples | | | | Comparative Examples | | | |
| --- | --- | --- | --- | --- | --- | --- | --- | --- |
| | 1 | 2 | 3 | 4 | 1 | 2 | 3 | 4 |
| $SiO_2$ | 57.10 | 57.50 | 57.34 | 56.52 | 57.30 | 57.40 | 56.04 | 57.75 |
| BaO | 12.46 | 12.16 | 12.21 | 12.21 | 12.30 | 12.04 | 12.92 | 11.20 |
| SrO | 7.91 | 8.22 | 8.28 | 7.88 | 8.20 | 8.63 | 7.52 | 8.71 |
| ZnO | 1.75 | 1.75 | 2.00 | 1.85 | 1.80 | 1.25 | 2.30 | 1.75 |
| $ZrO_2$ | 3.00 | 3.00 | 2.90 | 3.10 | 3.00 | 2.75 | 2.75 | 3.00 |
| $Al_2O_3$ | 1.50 | 1.50 | 1.60 | 1.80 | 1.70 | 1.75 | 2.40 | 1.50 |
| $Li_2O$ | 0.25 | 0 | 0 | 0.40 | 0 | 0.25 | 0.40 | 0 |
| $Na_2O$ | 4.86 | 6.73 | 6.73 | 4.53 | 7.28 | 4.85 | 5.09 | 6.67 |
| $K_2O$ | 10.07 | 8.04 | 7.84 | 10.61 | 7.32 | 10.05 | 9.48 | 8.29 |
| MgO + CaO | <0.1 | <0.1 | <0.1 | <0.1 | <0.1 | <0.1 | <0.1 | <0.1 |
| $CeO_2$ | 0.30 | 0.30 | 0.30 | 0.30 | 0.30 | 0.30 | 0.30 | 0.30 |
| $TiO_2$ | 0.40 | 0.40 | 0.40 | 0.40 | 0.40 | 0.40 | 0.40 | 0.40 |
| $Sb_2O_3$ | 0.40 | 0.40 | 0.40 | 0.40 | 0.40 | 0.40 | 0.40 | 0.40 |
| NiO (ppm) | 124 | 124 | 124 | 124 | 124 | 124 | 124 | 124 |
| $Co_3O_4$ (ppm) | 19 | 19 | 19 | 19 | 19 | 19 | 19 | 19 |

TABLE 1-continued

| Component (wt %) | Examples | | | | Comparative Examples | | | |
|---|---|---|---|---|---|---|---|---|
| | 1 | 2 | 3 | 4 | 1 | 2 | 3 | 4 |
| A | 0.612 | 0.597 | 0.596 | 0.608 | 0.600 | 0.578 | 0.632 | 0.562 |
| B | 4.75 | 4.75 | 4.90 | 4.95 | 4.80 | 4.00 | 5.05 | 4.75 |
| C | 0.567 | 0.544 | 0.538 | 0.529 | 0.501 | 0.567 | 0.479 | 0.554 |

A: $C_{BaO}/(C_{BaO} + C_{SrO})$,
B: $C_{ZrO2} + C_{ZnO}$,
C: $[C_{K2O}/(C_{K2O} + C_{Na2O})] - 0.43 C_{Li2O}$

TABLE 2

| | Examples | | | | Comparative Examples | | | |
|---|---|---|---|---|---|---|---|---|
| | 1 | 2 | 3 | 4 | 1 | 2 | 3 | 4 |
| linear X-ray absorption coefficient (cm$^{-1}$) | 34.4 | 34.3 | 34.4 | 34.5 | 34.3 | 34.3 | 34.2 | 34.3 |
| thermal expansion coefficient ($\times 10^{-7}$/° C.) | 98.4 | 98.6 | 98.7 | 98.5 | 98.7 | 98.6 | 98.2 | 98.8 |
| log electrical resistivity (Ωcm) | 7.9 | 7.5 | 7.5 | 7.9 | 7.3 | 7.9 | 7.7 | 7.6 |
| strain point (° C.) | 489 | 493 | 490 | 487 | 492 | 490 | 485 | 493 |
| light transmittance (%) | 52.0 | 51.5 | 52.5 | 52.1 | 51.8 | 50.9 | 52.2 | 53.0 |
| chromaticity x (P-22) | 0.2835 | 0.2839 | 0.2838 | 0.2834 | 0.2836 | 0.2834 | 0.2834 | 0.2837 |
| y (P-22) | 0.3139 | 0.3146 | 0.3147 | 0.3144 | 0.3153 | 0.3138 | 0.3157 | 0.3142 |
| | ○ | ○ | ○ | ○ | X | ○ | X | ○ |
| liquidus temperature (° C.) | 905 | 903 | 901 | 897 | 897 | 926 | 909 | 918 |
| 10$^5$ poise temperature (° C.) | 908 | 910 | 907 | 905 | 907 | 912 | 906 | 914 |
| Resistance to devitrification | ○ | ○ | ○ | ○ | ○ | X | X | X |

○: acceptable,
X: unacceptable

Figure 3:
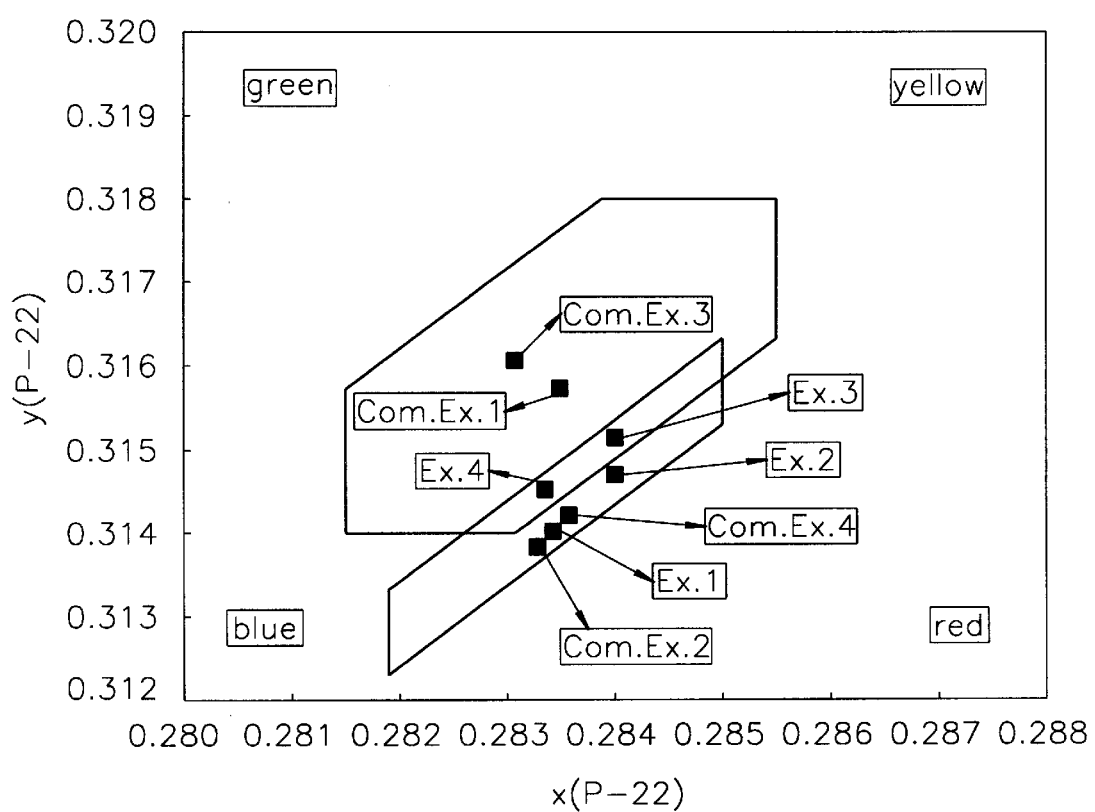
FIG. 3 exhibits the colors on color coordinates of the Tint products prepared in Examples and Comparative Examples provided herein.

As shown in Table 2, the glasses obtained in Examples 1 to 4 possess properties suitable for use as a cathode ray tube panel glass; while the glasses obtained in Comparative Example 2 to 4 do not satisfy the liquidus temperature requirement and, referring to FIG. 3, the colors of the products prepared in Comparative Examples 1 and 3 deviate from the color range required of a standard Tint product.

While the invention has been described with respect to the specific embodiments, it should be recognized that various modifications and changes may be made by those skilled in the art to the invention which also fall within the scope of the invention as defined by the appended claims.

What is claimed is:

1. A glass composition, for use in forming a front panel of a cathode ray tube, having a linear X-ray absorption coefficient of at least 34 cm$^{-1}$ at a wavelength of 0.6 Å, which comprises, based on the total oxides, 56.0 to 58.5 wt % of SiO$_2$, 11.0 to 13.0 wt % of BaO, 7.5 to 9.0 wt % of SrO, 2.5 to 3.5 wt % of ZrO$_2$, 1.0 to 2.5 wt % of ZnO, 0 to 0.5 wt % of Li$_2$O, 4 to 7.5 wt % of Na$_2$O, 7 to 11 wt % of K$_2$O, 1 to 2.5 wt % of Al$_2$O$_3$, 0 to 0.2 wt % of MgO, 0 to 0.3 wt % of CaO, 0.3 to 0.5 wt % of TiO$_2$, 0.2 to 0.5 wt % of CeO$_2$, and 0.2 to 0.5 wt % of Sb$_2$O$_3$; and satisfies the following formulae (1) to (3):

$$0.58 \leq C_{BaO}/(C_{BaO}+C_{SrO}) \leq 0.62 \qquad (1)$$

$$4.5 \leq C_{ZrO2}+C_{ZnO} \leq 6.0 \qquad (2)$$

$$0.52 \leq [C_{K2O}/(C_{K2O}+C_{Na2O})]-0.43 C_{Li2O} \leq 0.58 \qquad (3)$$

wherein $C_{BaO}$, $C_{SrO}$, $C_{ZrO2}$, $C_{ZnO}$, $C_{K2O}$, $C_{Na2O}$ and $C_{Li2O}$ represent the contents in % by weight of BaO, SrO, ZrO$_2$, ZnO, K$_2$O, Na$_2$O and Li$_2$O, respectively.

2. The glass composition of claim 1, which has a thermal expansion coefficient of 97.5 to 99.5×10$^{-7}$ ° C.$^{-1}$ at a temperature range of 0 to 300° C.; a strain point of at least 470° C.; and an electrical resistivity, when measured at 350 ° C., of at least 10$^7$ Ωcm.

3. The glass composition of claim 1, further comprising NiO, Co$_3$O$_4$ or a mixture thereof.

* * * * *